United States Patent [19]

Boldt

[11] 4,435,363
[45] Mar. 6, 1984

[54] CONTINUOUS COUNTERCURRENT LIQUID-SOLIDS CONTACTOR

[75] Inventor: Allyn L. Boldt, Kennewick, Wash.

[73] Assignee: Exxon Nuclear Company, Inc., Bellevue, Wash.

[21] Appl. No.: 280,113

[22] Filed: Jul. 2, 1981

[51] Int. Cl.³ .............................................. B01D 11/02
[52] U.S. Cl. .................................... 422/270; 422/273; 422/287; 422/903; 134/65; 134/132; 252/627; 376/310
[58] Field of Search ............................... 422/270–273, 422/159, 209, 284, 287, 288, 903; 134/65, 132; 75/84.1 A; 252/627; 376/310, 323

[56] References Cited

U.S. PATENT DOCUMENTS

| | | | |
|---|---|---|---|
| 2,746,950 | 5/1956 | Lolli | 422/270 |
| 2,952,588 | 9/1960 | Rinderer | 422/209 |
| 4,049,386 | 9/1977 | Gillain | 422/270 |
| 4,098,648 | 7/1978 | Kraemer et al. | 422/271 |
| 4,183,806 | 1/1980 | Giffard | 134/132 |
| 4,230,675 | 10/1980 | Yarbo | 422/159 |

FOREIGN PATENT DOCUMENTS 2034196 6/1980 United Kingdom ................ 422/284

Primary Examiner—David L. Lacey
Attorney, Agent, or Firm—Ronald D. Hantman

[57] ABSTRACT

An apparatus for continuously providing countercurrent liquid-solid contact. The preferred embodiment of the apparatus includes an Archimedes' screw in the form of a spiral and a distribution system which includes a central tube disposed along the axis of the spiral. The central tube includes a plurality of weirs and is in open communication with the spiral through a plurality of hollow spokes fixed at one end to the spiral and at the other end to the central tube.

Dissolving solution is distributed by the distribution system to the spiral where it encounters nuclear material moving upward due to the pumping action of the spiral. The dissolved material moves counter current to the nuclear material and removed near the bottom of the apparatus.

64 Claims, 15 Drawing Figures

CONTINUOUS COUNTERCURRENT LIQUID-SOLIDS CONTACTOR

BACKGROUND OF THE INVENTION

The present invention relates to a counter-current liquid-solids contactor.

A necessary and significant part of the nuclear reactor fuel cycle is the processing of nuclear fuel. Liquid-solid contacting is an element in the processing of nuclear fuel because processing requires the dissolution of various materials. Batch dissolution processes are the most commonly used. However, continuous dissolvers have advantages over batch operated dissolvers of, for example, uniformity of product, ease of control, elimination of off-gas peaks, better control of off-gas scrubbers and treatment systems, and reduced supporting equipment requirements.

An additional problem is encountered when dissolving fuel that is fabricated in rods clad in a metallic material such as stainless steel. It is desirable to remove the cladding and dissolve the fuel using as few steps as possible because of the difficulty in handling radioactive material. One method for processing such fuel, known as the shear-leach method, is to chop or shear the cladded rods into fuel pieces with the subsequent dissolution, or leaching, of the core fuel material from within the cladding. The cladding, largely inert to the dissolvent, must then be removed from the dissolver. However, no plant scale continuous dissolver for processing power reactor nuclear fuel using the shear-length method has been successfully operated to date.

The Oak Ridge National Laboratories (ORNL) have done extensive work in developing concepts for continuous dissolvers employing the shear-leach method and have designed, modeled or piloted a number of variations of continuous dissolvers. See Croenier, W. S., "Equipment for the Dissolution of Core Material from Sheared Power Reactor Fuels," *ORNL-TM94*, April 1971; Odom, C. H., "Continuous or Semicontinuous Leacher for Leaching Soluble Core Material from Sheared, Spent Nuclear Fuel Tubes," *Proceedings of 20th Conference on Remote Systems Technology*, 1972; Finney, B. C., et al, "Shear-Leach Process: Semicontinuous and Batch Leaching of Sheared, Unirradiated Stainless-Steel Clad and Zircaloy-2-Clad $UO_2$ and $UO_2$-$ThO_2$," *ORNL*-3984, July 1969. One type of continuous dissolver that has received considerable attention is one in which fuel passes through dissolvent located within an enclosed spiral, or Archimedes' screw. As the screw is rotated, the fuel advances through the dissolvent, eventually is raised out of the liquid and discharged.

The preferred embodiment of the present invention is a liquid-solids contactor of the Archimedes' screw type which may be used for the dissolution of nuclear fuel in a reprocessing system.

SUMMARY OF THE INVENTION

The present invention is an apparatus for contacting liquids and solids. The apparatus includes a means for separating solids into groups and conveying the groups uphill one after another. A distribution system brings liquid into countercurrent contact with the groups of solids as they move upward. The distribution system includes a housing containing a plurality of liquid diverters (weirs) and a plurality of means for maintaining open communication between the housing and the groups of solids. The housing separates the weirs from the means for separating and conveying the solids. The liquid passes back and forth from the housing to the groups of solids through the means for maintaining open communication between the housing system and the groups.

The apparatus includes a means for injecting liquid into the distribution system, a means for injecting solids into a bottom group to be conveyed uphill, and a means for withdrawing liquid and solids from the apparatus after they have contacted each other.

In a preferred embodiment, the separating and conveying means is an Archimedes' screw having the configuration of a hollow tube bent spirally around an axis. The screw is rotatably supported with its longitudinal axis at an acute angle with respect to the horizontal. The screw is rotated about its longitudinal axis to convey the solids uphill.

Liquid contacts the solids in the spiral as they move upward due to the pumping action of the spiral. The liquid is allocated to the spiral through the distribution system. The system includes a plurality of weirs enclosed in a tubular housing along the longitudinal axis of the spiral. Spokes connect the housing with the spiral at numerous points. The liquid enters the housing and is diverted by the weirs through the spokes to the spiral where it contacts the solids in one section of the spiral. Thereafter, the liquid passes through other spokes to re-enter the housing, the procedure being repeated as the solids move upward and liquid moves downward.

A preferred embodiment of the apparatus is used to dissolve nuclear fuel rods. The rods are sheared into segments and fed, along with acid, into the apparatus. The acid contacts the fuel pieces thereby dissolving the core fuel material of the fuel pieces leaving the cladding.

Then the spent acid and dissolved material pass together out the bottom of distribution system for later processing. The undissolved portion of the injected sheared rods (e.g. cladding) is pumped to the upper most section of the spiral and is discharged.

In a preferred embodiment of the present invention, the distribution system may be divided into two sections. The first section, or lower portion of the distribution system, supplies acid to the spiral to dissolve the solid fuel. The second section, or upper portion of the distribution system, supplies rinse solution to rinse the undissolved solid material before it is discharged from the upper most section of the spiral.

DESCRIPTION OF THE PREFERRED EMBODIMENT

The preferred embodiment of the present invention is an Archimedes' screw adapted to dissolve nuclear fuel material.

The fuel material may be core material of segmented fuel rods. In that case, the fuel pieces to be dissolved include cladding which is largely inert to the acid used to dissolve the fuel material. The fuel pieces enter the bottom of the screw and are conveyed uphill by the pumping action of the screw. Dissolving solution, acid, is injected into the screw from a distribution system including a plurality of liquid diverters, or weirs. The weirs are enclosed within a tubular housing along the longitudinal axis of the screw. The housing is located external of the conveying means. However, the distribution system also includes a plurality of spokes connecting the housing and the screw so that the housing is in open communication with the screw. Acid travels from the weir system into a section of screw to dissolve fuel material and then the acid travels back to the housing (and weir system) from where it is diverted into another section of the screw.

Figures 1, 2, 3:
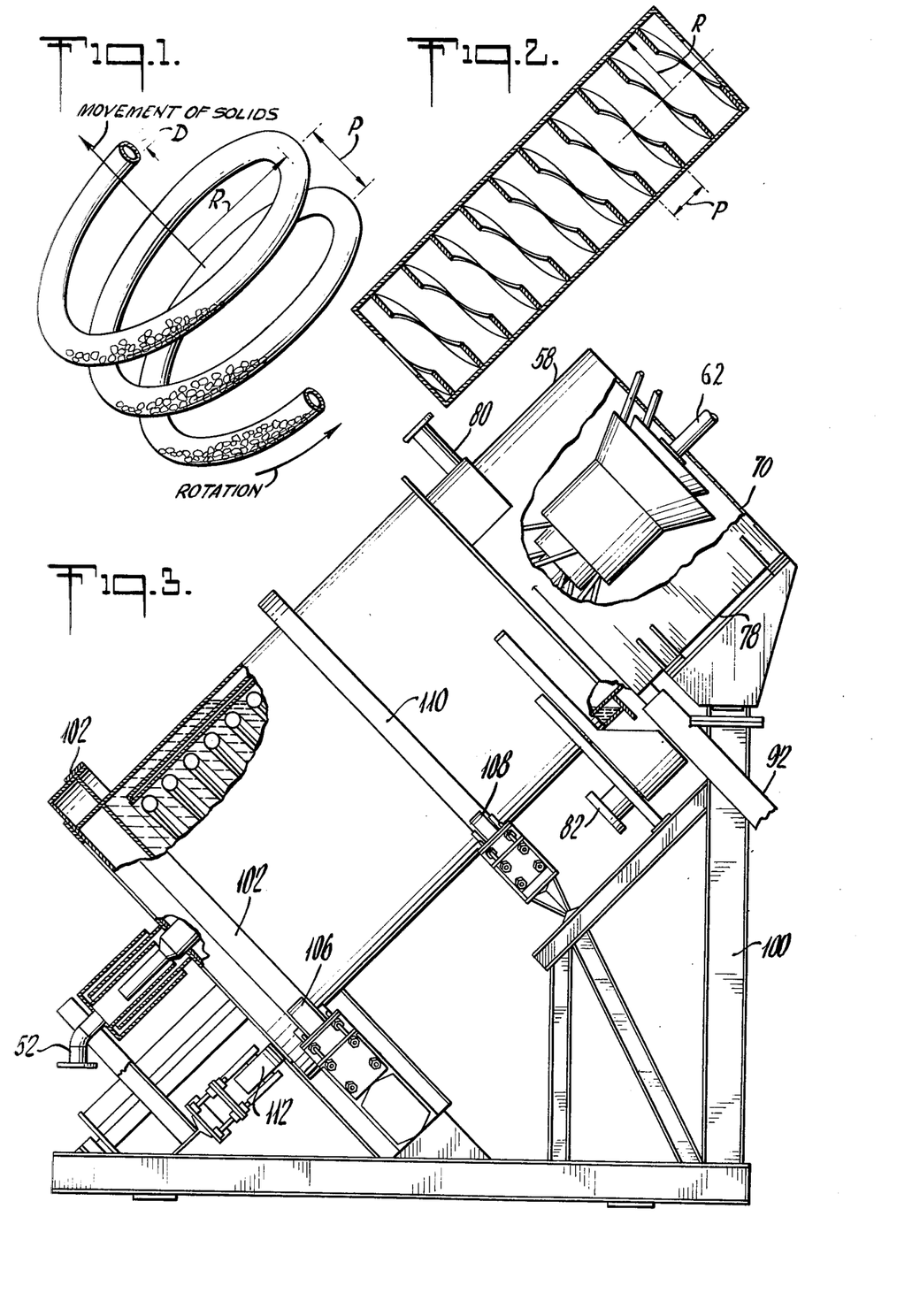
FIG. 1 is an Archimedes' screw having the configuration of a tube bent spirally around an axis.
FIG. 2 is an Archimedes' screw having the configuration of a broad-threaded screw encased by a cylinder.
FIG. 3 is an elevational view, partially broken away, of the contactor.

An Archimedes' screw may have the configuration of either a tube bent spirally around an axis or a broad-threaded screw encased by a cylinder (see FIGS. 1 and 2). In the preferred embodiment, the spiral tube version of the Archimedes' screw (see FIG. 5) is used. The spiral may be a one-piece construction or spiral loop segments fastened together. It is desirable that the inner surface of the spiral be smooth so as not to allow material to accumulate about any protrusion on the inner surface. The axis of the spiral is fixed at an acute angle with respect to the horizontal (see FIG. 3). The preferred angle of inclination is between 25° and 45°. A more preferred range is between 30° and 35° The spiral is rotated about its axis and material within the tube of the spiral loops moves upward. FIG. 1 shows the relationship between the rotation of the spiral and movement of material within the tube. The preferred embodiment, as shown employs a left-handed spiral (a right-handed spiral could just as easily be used). Rotation is then clockwise about the axis when viewed along the axis from below.

Fuel material to be dissolved enters the spiral at the bottom of the spiral and moves upward as the spiral is rotated. The spiral can be viewed as a series of connected spiral loops. Because of the force of gravity, the solids within each loop will rest in that part of each loop closest to the horizontal (see FIG. 1). Therefore, the spiral loops form a series of compartments with each compartment carrying a load of solids upward to be dissolved. During continuous operation, all spiral loops simultaneously contain solids. These solids consist of either fuel material to be dissolved or waste material such as cladding that will not be dissolved and is carried upward to be discarded.

Dissolution or leaching is attained by the countercurrent flow of acid. Acid is injected into the distribution system at the top of the apparatus and is diverted to a spiral loop. If, as in the embodiment shown in the figures, the spiral includes a rinsing distribution system to rinse the waste material before it is ejected at the top (discussed more fully below), then the acid is, after injection into the system, diverted to a spiral loop about seventh from the top.

In general, the number of spiral loops for each distribution system, i.e. the acid system or rinse system, may be any convenient number, including fractional parts of numbers, e.g. 3½ loops per system. Liquid may be introduced into the apparatus at more than one point and into more than one spiral loop. In addition, the contactor may include only one system. That is, the rinse system may be omitted. Therefore, the injection of acid into the seventh loop is but one possibility.

Figure 4:
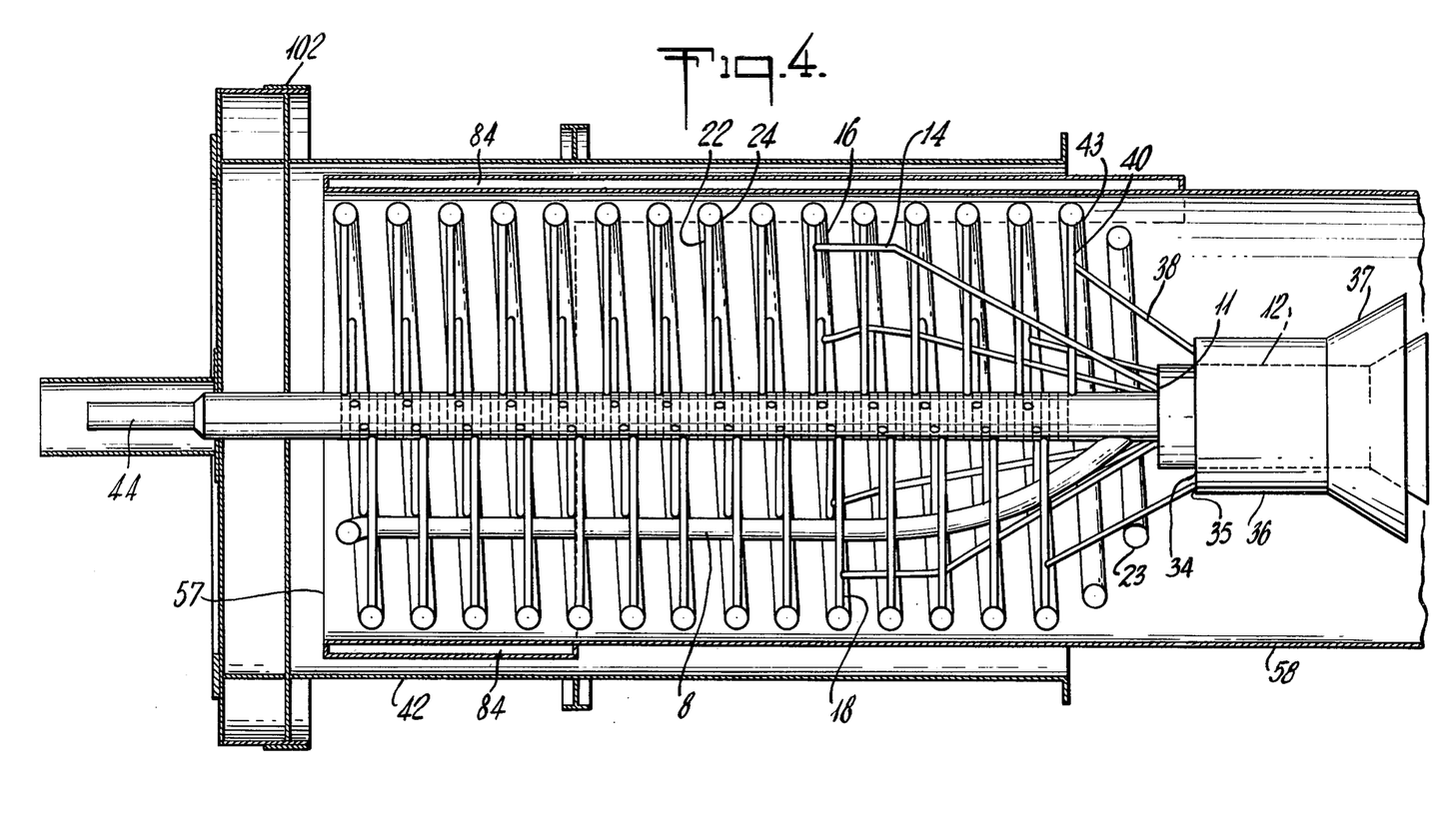
FIG. 4 is a cross-sectional view of the spiral, the containment drum and a portion of the bonnet.
Figure 5:
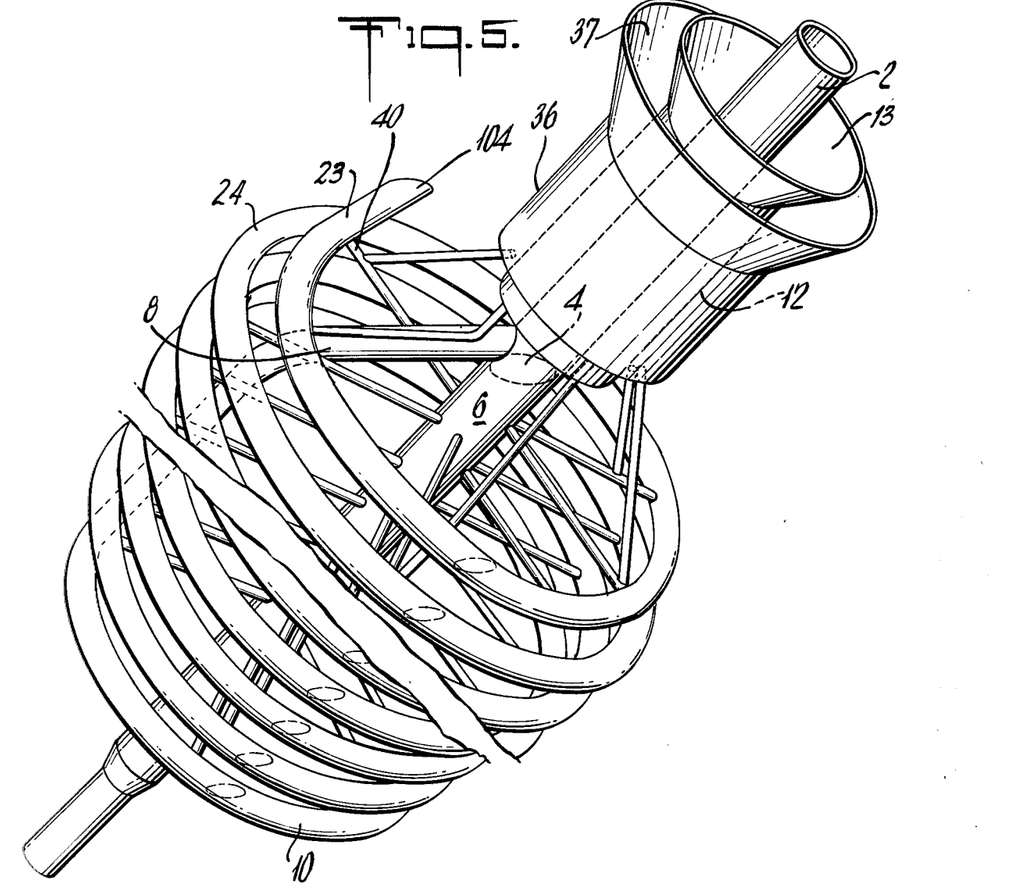
FIG. 5 is a perspective view of the spiral including feed tubes and receivers.
Figures 7, 8, 9, 10:
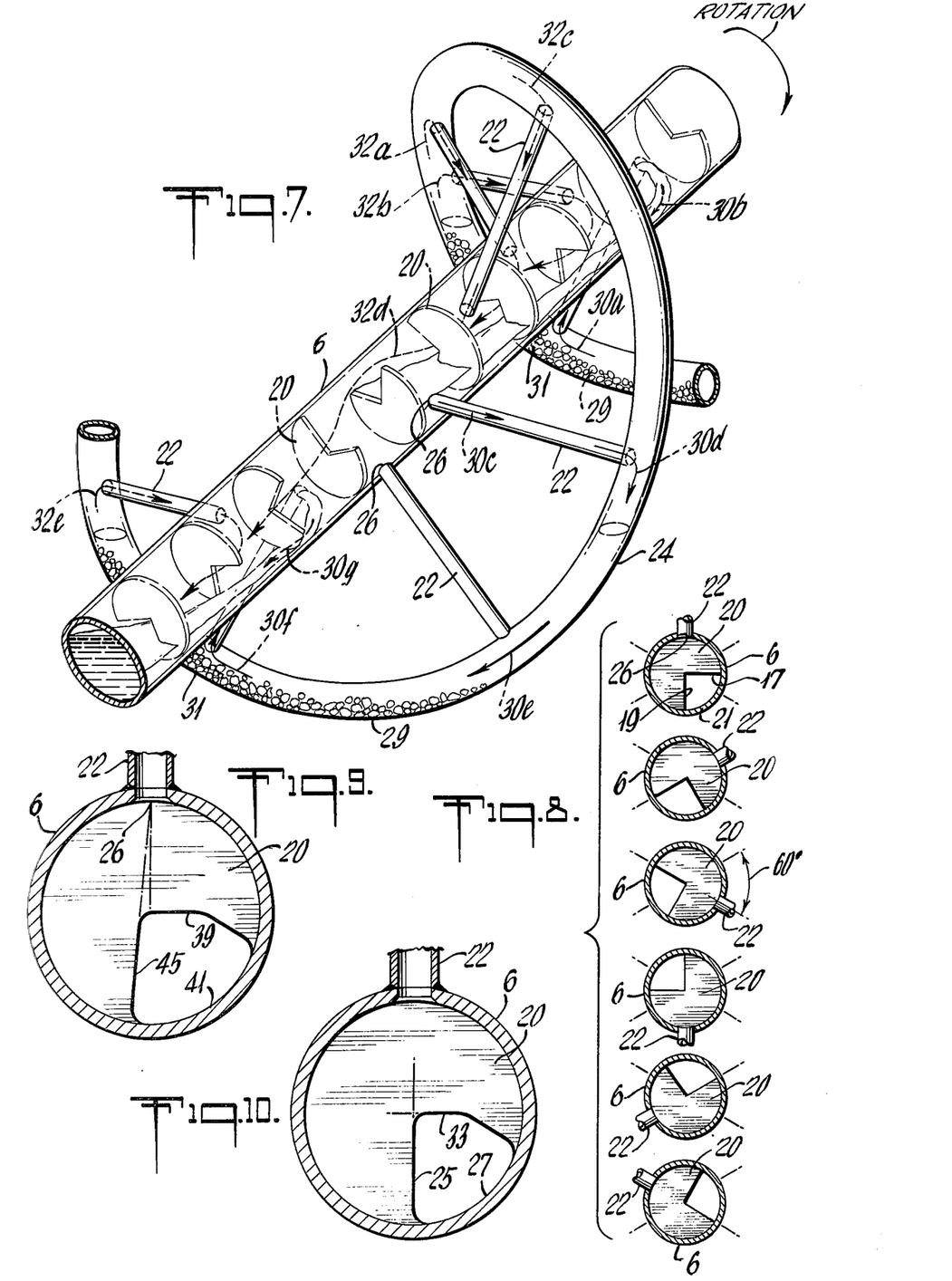
FIG. 7 is a segment of the distribution and spiral showing the paths taken by the solids, liquids and gases.
FIG. 8 is a sequence of six successive weirs showing their relationship to their corresponding spokes.
FIG. 9 is an alternative embodiment showing a different type of weir.
FIG. 10 is an alternative embodiment showing a different type of weir.

The acid proceeds downward through the remaining spiral loops dissolving the fuel and carrying the dissolved fuel to the bottom of the spiral. Although the rotating spiral moves liquid as well as solids upward, the acid is injected at a rate exceeding the rate of upward movement due to the pumping action of the spiral and so the net flow of acid is downward. The acid is distributed within the spiral from a central tube located along the longitudinal axis of the spiral and connected to the spiral by a plurality of tubular spokes. Undissolved solids are carried to the top of the spiral and ejected from the system. If the apparatus also includes a rinsing distribution system, the undissolved solids are washed before being ejected from the system. The allocation of acid or water to various parts of the spiral is accomplished by a weir system in the central tube. FIGS. 4 and 5 show the spiral, the distribution system and the connecting spokes. FIG. 7 shows the weir system for a portion of the central tube. A detailed description of the apparatus and its use follows below.

Figure 6:
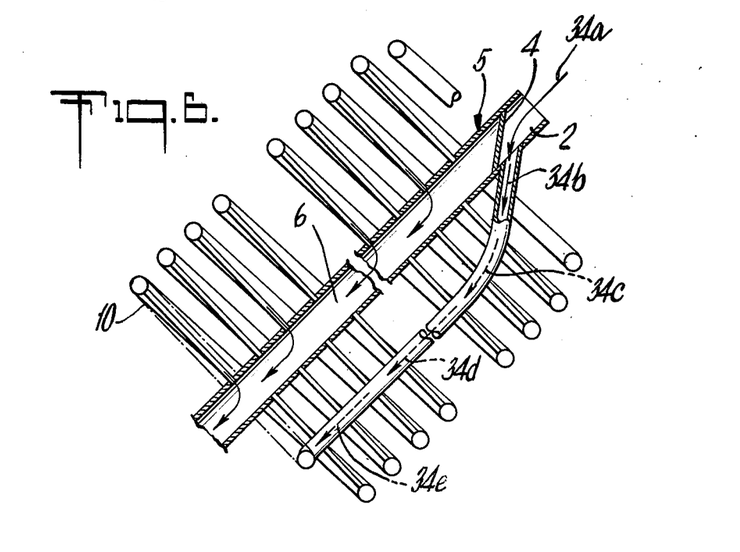
FIG. 6 is a cross-section of the spiral showing the path of the fuel pieces.

The fuel pieces, which include, for example, uranium dioxide clad with zircaloy or stainless steel, are fed into the upper end 2 (see FIGS. 5 and 6) of the hollow central tube 5. A baffle 4 prevents the fuel pieces from entering the lower end 6 of the central tube 5 below the baffle 4 in which the weir system is located. The baffle 4 is obliquely disposed with respect to the axis of the central tube 5 and its periphery is sealed to the inner wall of the central tube 5 by conventional means. The baffle 4 completely separates the central tube 5 into an upper end 2 and a lower end 6. The fuel pieces, having been diverted from the central tube by the baffle 4, enter an extension 8 of the bottom spiral loop 10. One end of the extension 8 is directly connected to the bottom spiral loop 10 and the other end of the extension intercepts the upper end 2 of the central tube 5 immediately above the baffle 4. Therefore, solids injected into the upper end 2 proceed uninterrupted through the upper end 2 and into extension 8 where the solids fall by gravity to the bottom spiral loop 10 along the path 34a-34e shown in FIG. 6. After entering the bottom spiral 10, the solids continue their journey by being raised upward by the rotating spiral.

Acid (e.g., nitric acid) capable of dissolving nuclear fuel compounds (e.g., uranium dioxide), is fed into the acid annular receiver 12 (see FIGS. 4 and 11) which is a cylindrical receptacle concentric with the upper end 2 of the central tube. The bottom 11 of the cylindrical acid annular receiver 12 is a circular member with a centrally located hole having a diameter equal to that of the upper end 2 of the central tube 5. The upper end 2 extends through the hole in the bottom 11 of the receiver 12 and is in sealing engagement with the periphery of the hole thereby fixing the receiver to the upper end 2. The top 13 of the receiver may be flared to facilitate the insertion of the acid. One end of each of the acid inlet feed tubes 14 intercepts an acid inlet spoke 18 and the other end of each of the inlet feed tubes 14 penetrates the bottom 11 of the acid annular receiver 12 and terminating a distance above the bottom 11 of the receiver (this feature is discussed in greater detail below). Thus, after entering the receiver 12, the acid may leave the receiver 12 only by entering one of the several acid inlet feed tubes 14 which connect the acid annular receiver 12 to the acid inlet spokes 18 that connect the central tube 6 below the baffle 4 to the spiral at about the seventh spiral loop 16 from the top (see FIGS. 4, 5 and 11). The acid then passes through the acid inlet spokes 18 into the spiral loop 16 where it encounters the solid fuel to be dissolved. The acid and dissolved fuel proceed down the spiral through the remaining spiral loops in a controlled manner through a system of weirs 20 (see FIG. 7) located in the central tube 6 which directs the acid into and out of each spiral loop 24 through the tubular spokes 22. Spokes 22 differ from spokes 18 only in that they are not intercepted by the acid feed tubes 14. Spiral loop 16 differs from spiral loops 24 only in that loop 16 is the first loop in which the acid enters after leaving the acid annular receiver 12 via the acid feed tubes 14 and acid inlet spikes 18.

The number of spokes per spiral loop may vary according to process requirements and economics. As few as 4 spokes per spiral loop may be used. In the embodiment shown in the figures, six spokes per loop are used.

Each spiral loop 24 is rigidly attached to the central tube 6 below the baffle 4 by tubular spokes 22 spaced at 60 degree intervals around the central tube when viewed along the axis of the spiral (see FIG. 7). If four spokes per loop were used, then the angular interval between spokes would be 90°. Therefore, for each spiral loop 24, six spokes 22 connect the loop 24 to the central tube 6. As the spiral winds around the central tube the positions of connection 26 between the spokes 22 and central tube 6 correspondingly wind around the central tube. In addition, the positions of connection 26 move longitudinally along the central tube 6 as the spokes wind around the central tube 6. The spokes intercept the central tube 6 approximately at right angles with respect to the longitudinal axis of the central tube 6. Therefore, for each spiral loop, there are six spokes whose positions of connection 26 move a distance along the central tube equal to the pitch, p, of the spiral (see FIG. 1).

Because there are six spokes for each spiral loop, each spoke 18 and 22 is rotated 60° about the central tube 6 with respect to each successive spoke. Starting from the first spoke, the seventh spoke will be rotated $6 \times 60° = 360°$ or one complete revolution with respect to the first spoke. Therefore, the spokes 18 and 22 fall into six groups so that when viewing the spiral along the axis of the central tube 6 from above, only the first six spokes associated with the top spiral loop may be seen, all the remaining spokes being hidden from view (see FIG. 12).

As discussed above, the acid inlet feed tubes 14 connect the annular receiver 12 to the spokes 18 which connect the central tube 6 below the baffle 4 to about the seventh spiral loop 16 from the top. To avoid interfering with the intervening spokes for the six spiral loops above the seventh loop, the acid inlet feed tubes 14 must be bent around the intervening spokes (see FIGS. 11 and 12). After bypassing the intervening spokes, the feed tubes 14 may be bent so as to intercept the bottom 11 of the annular receiver 12 along a radius of the circular cross-section of the receiver, that is, parallel to the spokes 18 and 22. (Note that is not the case for the water inlet feed tubes 38, as will be discussed below).

Inside the central tube 6, a system of weirs, one weir 20 corresponding to each tubular spoke 22, directs acid through the spiral. FIG. 7 shows a portion of the spiral, about 1⅓ spiral loops, the connecting tubular spokes 22 and the corresponding weirs 20. In one embodiment, the weirs are circular disc-shaped members, except for a portion between two radii 17 and 19 and an arc segment 21, about one-quarter of the circular member, cut away (see FIG. 8). One radii 19 of the cut away portion is aligned with the longitudinal axis of the spoke 22 corresponding to that weir. That is, if the longitudinal axis of the spoke 22 were extended across the weir it would join one radii 19 of the cut away portion. The periphery of the remaining three quarters of the circular member is in sealing engagement with the cylindrical central tube 6.

In another embodiment, shown in FIGS. 9 and 10, the weirs associated with the rinse section of the dissolver are different from those of the acid section of the dissolver and both are different from the weir discussed above. The rinse weir, shown in FIG. 10, has less than one-quarter cut away. The cut-out portion is bounded by a radii 25, an arc segment 27 and a broken line segment 33. The radii 25 and broken line segment 33 intersect at the center of the weir and proceed outward along radii at right angles from each other toward the arc segment just as for the weir discussed above. However, in the present case, one of radii 33 bends toward the other radii 25 rather than extending in a straight line all the way to the arc segment. The acid weir (FIG. 9), used in conjunction with the rinse weir just described, is similar to the rinse weir except that the cut-out section is larger than the rinse weir to increase the open area available for off-gas passage. The enlargement of the cut-out section is achieved by having one side 45 of the cut-out portion of the acid weir lie outside the radii 25 of the rinse weir. The remaining sides 39 and 41 of the cut-out section of the acid weir are similar to the sides 33 and 27 of the rinse weir.

The weir cut out may be a combination of those shown in FIG. 9 and 10. For example, the design of FIG. 10 may be used in the upper portion of the apparatus and the design of FIG. 9 may in the lower portion. Other options would include using the design of FIG. 9 throughout the apparatus.

The weirs are located along the length of the central tube 6. In the preferred embodiment, there are six weirs in the central tube, equally spaced, for each spiral loop 24. Each successive weir is rotated 60° with respect to adjacent weirs. FIG. 8 shows 6 successive weirs 20, segments of corresponding tubular spokes 22 at the connecting position 26 and the relationship between the spoke 22 and orientation of the radii 19 of the weir 20.

FIG. 7 traces the path $30a$ through $30g$ taken by the acid starting with acid in that part of spiral loops closest to the horizontal 29 (bottom of spiral loop). As the spiral is rotated, the contained solids are conveyed up until gravity causes the solids to slide and tumble back toward the bottom 29 of the spiral loop although the rotary motion of the spiral will prevent the solids from falling all the way back to the bottom 29 of the spiral loop and, thus, the solids will remain substantially in that lower portion of the loop 31 rotating in the upward direction. As the spoke 22 starts rotating up, the acid flows from the portion of the spiral loop 31 rotating up through the spoke and into the central tube 6 along the path 30a and 30b. Acid flowing into the central tube 6 is directed by the weir system down the tube until it reaches the weir corresponding to the inlet spoke for the next lower spiral loop. The weir diverts the acid along paths 30c and 30d to the loop. The acid flows along the path 30e in the loop, encounters the solids within the loop, in that portion 31 that is moving up and flows along path 30f out of the loop and into the spoke that is starting to rotate upward. The acid flows back into the central tube and is directed down the tube along path 30g by the weir system. The acid cascades down the spiral into and out of each spiral loop in sequence and provides acid flow countercurrent to the motion of the solids. In the preferred embodiment, using six spokes per spiral loop, the spiral loops are maintained at about one-half full of liquid. The spokes and weirs are arranged so that as a given spoke crosses the horizontal while rotating downward, the spoke serves as a liquid inlet spoke to spiral loop (30c and 30d in FIG. 7). As the spokes continue to rotate downward for approximately the next 60 degrees, acid flows through the spoke into the spiral loop. The flow ceases as the spoke rotates through the 60 degree arc including the lowest point of its trajectory (30e of 30f in FIG. 7). As the spoke starts rotating upward, acid flows out of the loop through the spoke and into the central tube (30f in FIG. 7). Acid flow ceases approximately when the spoke crosses the horizontal on its upward motion.

Dissolution of nuclear fuel in nitric acid produces off-gas. The components of the off-gas include nitrogen-oxygen compounds and small amounts of gaseous fission fragments. The off-gas is carried from the spiral loop where it is produced to the central tube 6. The gas reaches the central tube 6 by passing through the spokes along paths 32a, 32b, 32c and 32e (see FIG. 7) when the spokes are rotating above the spiral liquid level. Gases reaching the central tube 6 may proceed down the central tube along the path 32d bypassing lower spiral loops to the bottom of the central tube 6 and taken off to be processed by conventional means. In summary, by virtue of the spoke and central tube weir assembly, starting when the spoke is horizontal and moving downward, the spoke serves as a liquid inlet to the spiral loop for approximately 60 degrss of rotation, provides no flow of gas or liquid for the next 60 degrees as the spoke passes the lowest point of rotation, serves as liquid outlets from the spiral loops to the central tube for the next 60 degrees, the flow ceasing as the spoke crosses the horizontal moving upward, and serves as off-gas ventilation lines for 180 degrees of rotation when the spoke is above the spiral loop liquid level.

As the chopped fuel pieces move up the spiral, a load in each spiral loop, the fuel is dissolved by the acid and is carried down the central tube and out of the spiral dissolver. The pieces of fuel rod cladding remain undissolved and are carried to the top of the spiral and ejected from the uppermost spiral loop 23 (See FIGS. 5 and 12). The solids fall by gravity from the open end 104 of the uppermost spiral loop once per dissolved revolution when the open end is generally pointing downward (this feature is discussed in greater detail below).

Before reaching the uppermost spiral 23 and being ejected, the cladding pieces may be rinsed with water. (Although water is specified as the rinse in the following discussion, other solutions may be used equally well in the dissolver). Water is fed into the water annular receiver 36 (see FIGS. 4, 5 and 11), a cylindrical receptical with a flared top 37, which surrounds but is isolated from the acid annular receiver 12. The water annular receiver 36 is concentric with the acid annular receiver 12 and is secured to the acid annular receiver 12 in the same manner that the acid annular receiver 12 is secured to the upper end 2 of the central tube 6. That is, the bottom 35 of the water annular receiver 36 is a circular member with a centrally located hole having a diameter equal to that of the outer diameter of the acid annular receiver 12, which extends through the hole and is in sealing engagement with the periphery of the hold thereby fixing the water receiver 36 to the acid receiver 12. One end of each of the water inlet feed tubes 38 intercepts a water inlet spoke 40 and the other end of each of the inlet feed tubes 38 penetrates the bottom 35 of the water annular receiver. Thus, after entering receiver 36, the water may leave the receiver 36 only by entering into the water feed tubes 38 which carry the water to spokes 40, that connect the center tube 6 to the spiral at the second spiral loop 43 from the top. Although the preferred embodiment shows two loops above the water entry point, other numbers of loops may be used.

The water passes through the spokes 40 and into the spiral loop where it encounters the undissolved solids. The spiral loop and distribution system is similar throughout the spiral and so the path travelled by the rinse-water into and out of each spiral loop is similar to the path travelled by the acid, except that only water travels through the system between second 43 and seventh 16 spiral loops. Both travel through the system from the seventh loop 16 to the bottom of the spiral. Water is injected into the spiral at a rate exceeding the rate at which water is carried up by action of the Archimedes' screw. Thus, there is net flow of water down the dissolver assembly displacing nitric acid down the assembly and preventing acid and dissolved fuel material from being pumped out the upper end. Some water that is carried up by the Archimedes' screw is discharged with the undissolved cladding pieces and may be recycled for reinjection into the dissolver.

Figure 12:
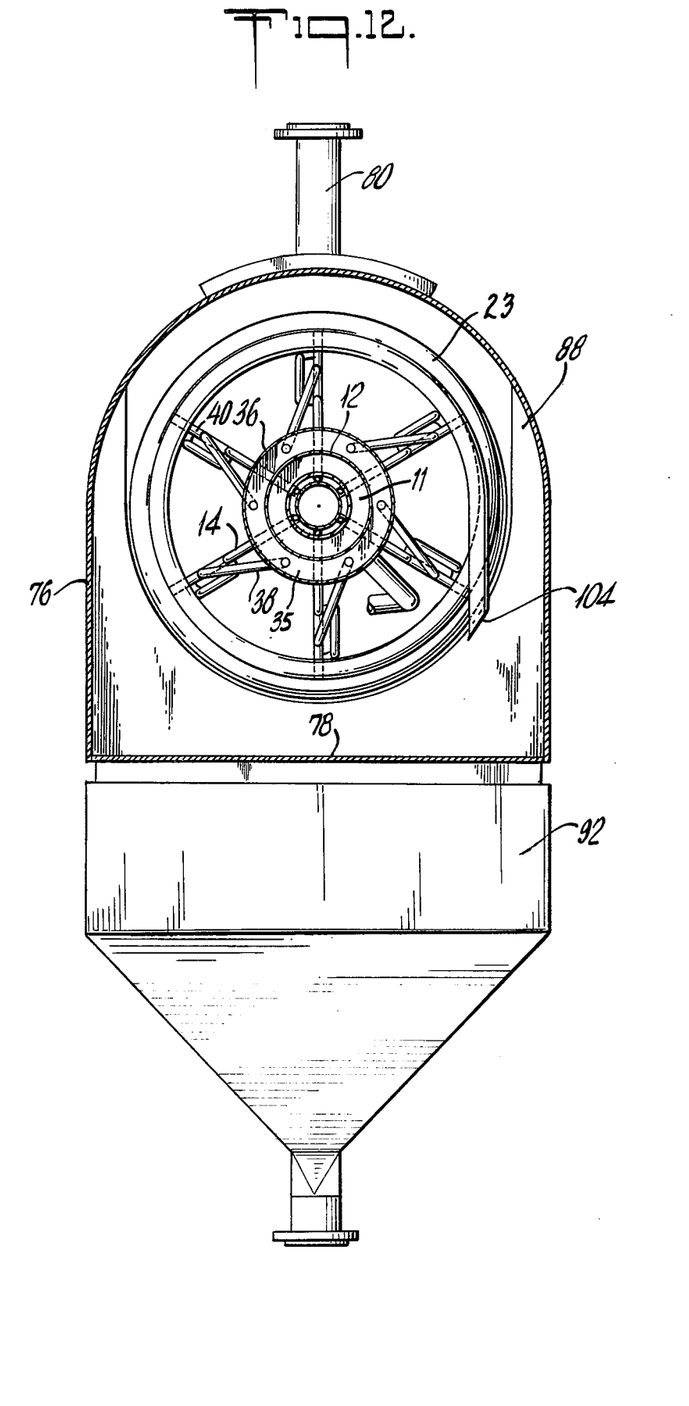
FIG. 12 is a cross-sectional view taken along line 12—12 of FIG. 11.

The water inlet feed tubes 38 intersect the bottom 35 of the water annular receiver 36 at an acute angle with respect to the spokes (see FIG. 12). This arrangement has been found to facilitate the allocation of the rinse solution to the spiral loops and rinse effectiveness of the apparatus. Note that this arrangement differs from that for the acid inlet feed tubes 14 as discussed earlier. Also in contrast to the acid inlet feed tube 14, the water inlet feed tube 38 intercept the water inlet spokes 40 which are the first six spokes starting from the top of spiral, that connect the central tube 6 to the spiral loops and, therefore, do not have to be bent so as to avoid interfering with intervening spokes.

Figure 11:
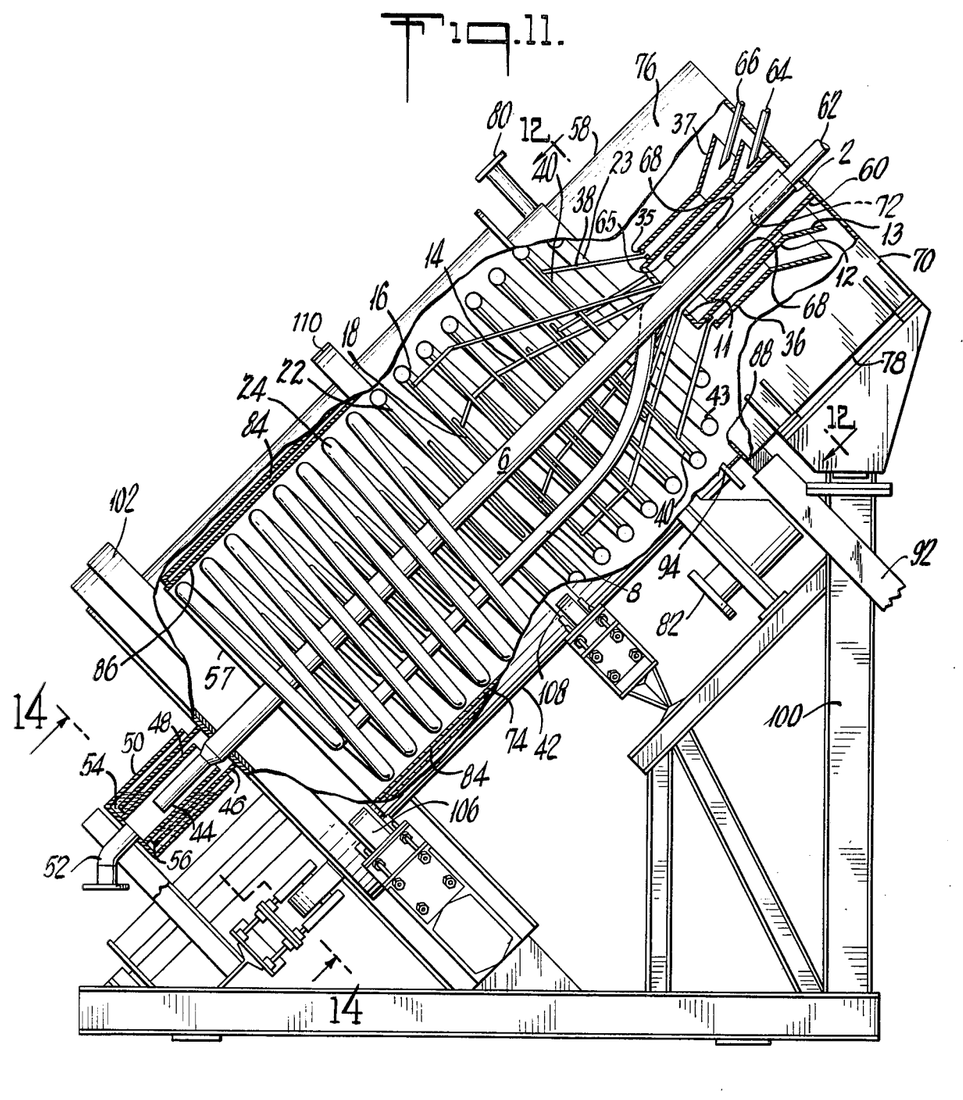
FIG. 11 is an elevational view, partially broken away, of the contactor.
Figure 14:
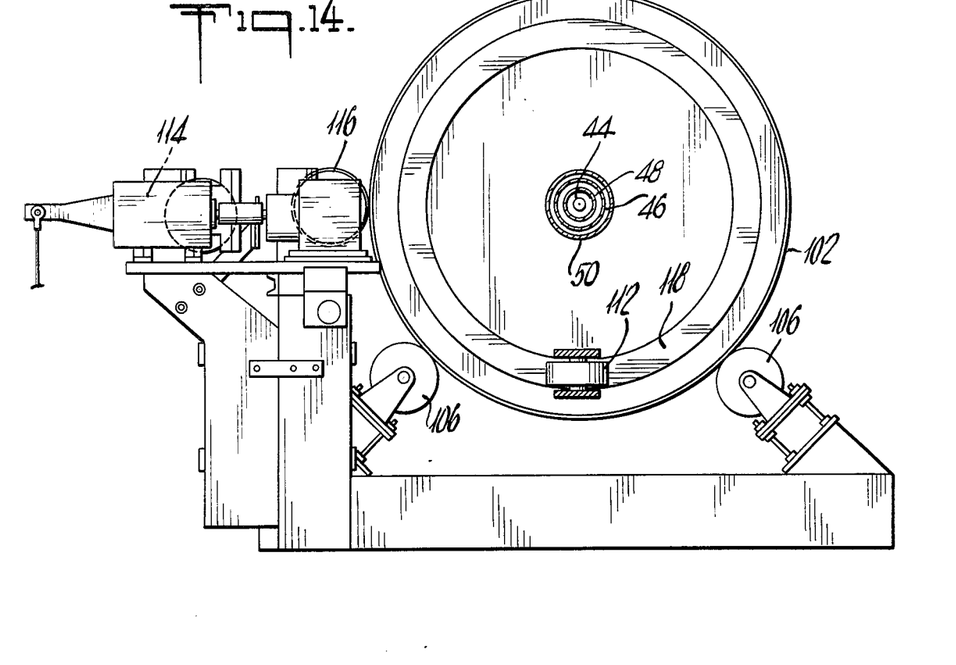
FIG. 14 is a bottom view of the contactor.

The spiral, spoke and central tube assembly is attached to the bottom of an open topped drum 42 (see FIG. 11). The inclined drumspiral assembly rotates as a unit with acid and dissolved fuel discharged through an inner cylinder 44 which is an extension of the central tube 6. The assembly is rotatably supported by conventional means. FIG. 11 shows the assembly and support system. FIG. 14 shows the assembly, support and rotational means when viewed from below. The inner cylinder is surrounded by an outer cylinder 46. Outer cylinder 46 which is concentric with inner cylinder 44, is fixed to the bottom of the drum and rotates with drum-spiral assembly. Between the concentric cylinders 44 and 46 is another concentric cylinder, outlet inner cylinder 48, which is connected to the outlet tube 52 for the dissolver solution and off-gas. Surrounding outer cylinder 46 is another concentric cylinder, outlet outer cylinder 50, which is rigidly attached to both outlet tube 52 and outlet inner cylinder 48 and concentric with outlet inner cylinder 48. The assembly composed of concentric cylinders 48 and 50 and outlet 52 is stationary and does not rotate with the drum-spiral assembly. Although the stationary pair of concentric cylinder 48 and 50 is not in mechanical contact with the rotating pair 44 and 46, a liquid seal is formed by inserting a liquid 54 into the region between concentric cylinders 48 and 50 such that the mouth 56 of outer cylinder 46 is completely submerged in the liquid 54. Outlet tube 52 feeds into a closed system for processing the discharges (now shown) and when combined with the liquid seal, prevents the off-gas from escaping into the environment.

Figure 13:
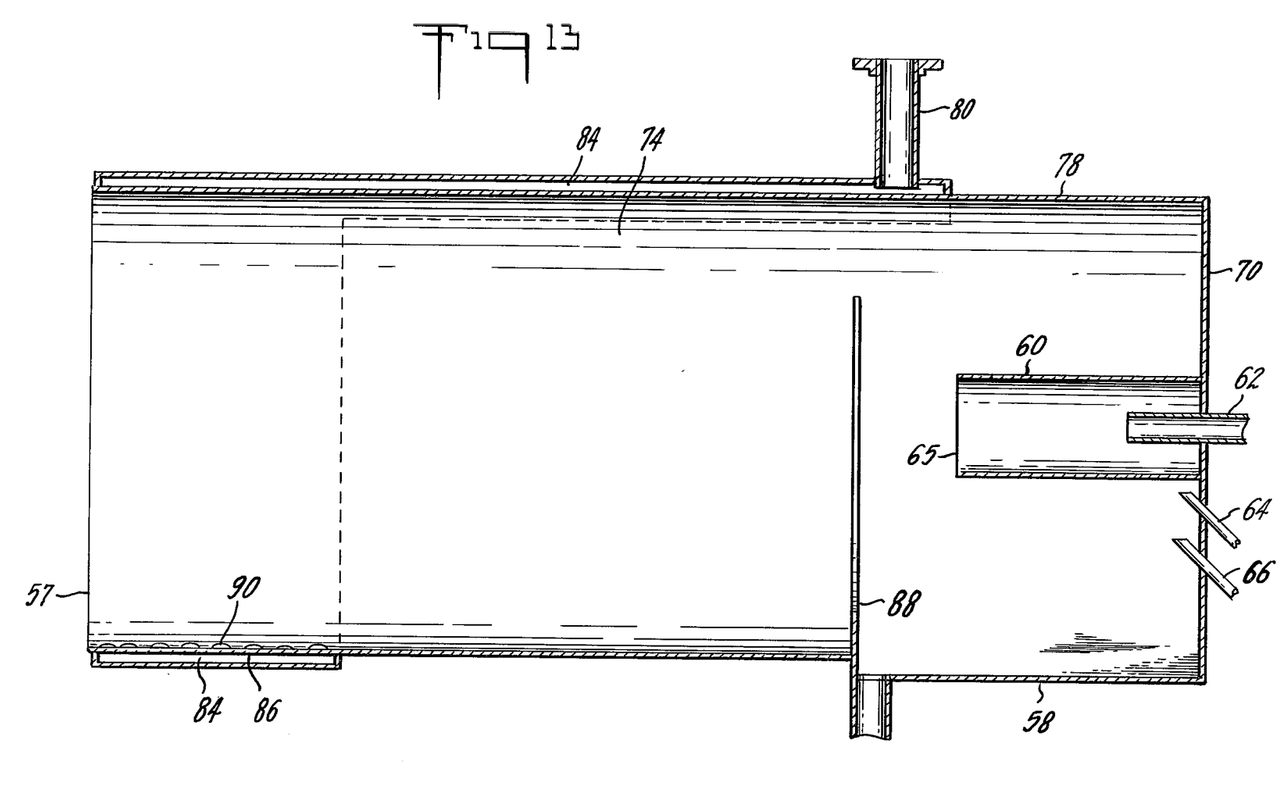
FIG. 13 is a cross-sectional view of the bonnet.

A stationary covering, or bonnet 58, whose top includes several tubular openings, encloses the top of the spiral and is shown in FIG. 13. The lower portion 74 of the bonnet 58 is cylindrical and fits between the spiral and the drum 42 and is concentric with the drum 42 (see FIGS. 3, 4 and 11). The upper portion 76 of the bonnet outside the drum 42 has a different configuration that the lower portion of the bonnet (see FIG. 12) so as to include a flat face 78 to facilitate discharge of the waste from the system (discussed below). The bonnet is rigidly supported and like the off-gas and dissolver solution outlet assembly, is not mechanically connected to the rotating drum-spiral assembly at any point. The top 70 of the bonnet includes a fuel inlet tube 62. The tube 62 extends on both sides of the top 70 of the bonnet. The portion of the fuel inlet tube 62 outside the bonnet is connected to a fuel supply system (not shown). The portion of the inlet tube extending inside the bonnet is of sufficient length that the mouth 72 of the fuel inlet tube 62 is inside and concentric with a portion of the upper end 2 of the central tube 4 of the spiral. A bonnet cylinder 60 fixed to the inside of the bonnet extends within and is concentric with the annular receiver 12. The acid inlet feed tubes 14 that carry acid from the receiver 12 to the spokes 18 extend into the receiver 12 so that acid fills the receiver 12 up to the end 68 of the acid feed tube 14 and therefore the mouth 65 of the bonnet cylinder 60 is submerged in the acid that fills the annular receiver 12. Acid is supplied to the annular receiver 12 by an acid inlet tube 64 fixed to the bonnet 58 and extending on both sides of the top 70 of the bonnet 58. The end of the acid inlet tube 64 inside the fixed bonnet 58 is positioned above the annular region between concentric cylinders 60 and 12 so that acid passing through the inlet tube 64 will enter the annular region between the concentric cylinders 60 and 12 even though inlet tube 64 is fixed and cylinders 36 and 12 are rotating. The acid fills the annular receiver 12 until the level of the contained acid exceeds the height of opening 68 in the acid feed tube 14. The contained acid in the annular receiver 12 below the opening 68 serves as a liquid vapor seal.

Similarly, water is injected into a water inlet tube 66 fixed to the bonnet and extending on both sides of the top 70 of the bonnet. The end of the water inlet tube 66 inside the fixed bonnet is positioned above the annular region between the concentric receivers 36 and 12 so that water will enter the annular receiver 36. The water annular receiver 36 may also have a liquid vapor seal (not shown) similar to the seal in the acid annular receiver 12.

Figure 15:
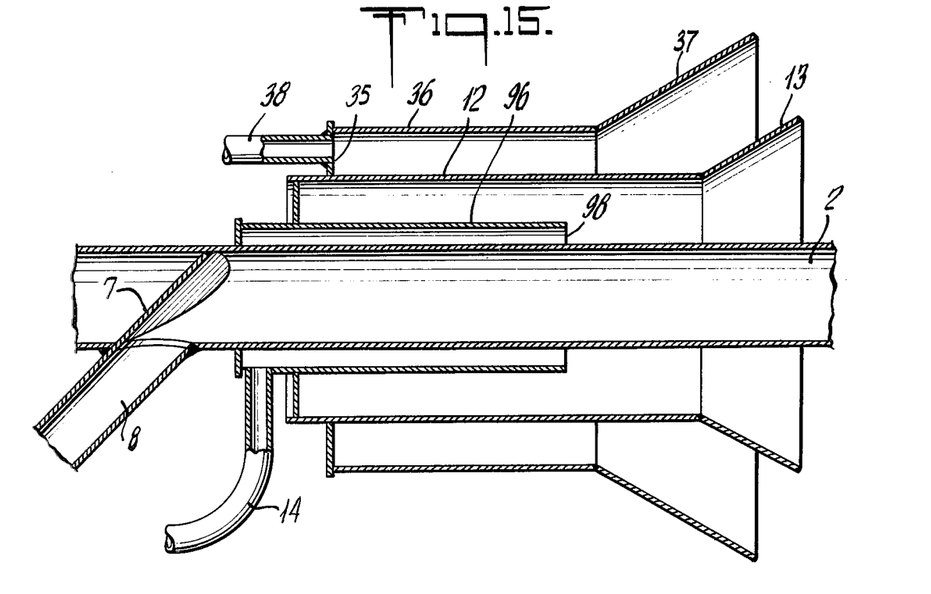
FIG. 15 is an alternative embodiment showing a different type of inlet tube.

An alternative structure for maintaining a liquid seal in the acid annular receiver 12 is shown in FIG. 15. In this structure, the extensions of the acid inlet feed tubes 14 into the receiver 12 have been replaced by cylinder 96 concentric with the annular receiver 12. The acid inlet feed tubes 14 then terminate at the base of the cylinder 96. In a similar manner to the liquid seal described earlier, the acid supplied to the receiver 12 can continue its journey through the spiral only when the level of acid in the receiver 12 exceeds the top 98 of the cylinder 96.

Fuel cladding or dissolved solids are discharged from the opening at the end of the straight section 104 of the uppermost spiral loop. The top spiral loop 23 has a smaller diameter than the other spiral loops (see FIG. 4, 11 and 12) so that the bonnet may be removed without the collector 88 interfering with the spiral. A portion of the end 104 of the top spiral loop 23 is a straight section 104 whose open end extends over the collector 88 when the straight section 104 is generally pointing toward the flat side 78 of the upper portion 76 of the bonnet. The bonnet may be removed without the collector 88 interfering with the straight section 104 when the spiral is rotated so that the straight section 104 is in the region adjacent to the curved side opposite the flat face 78 of the upper portion 76 of the bonnet. The solids fall by gravity from the open end once per revolution when the open end 104 is generally pointing downward toward the flat face 78 of the upper portion 76 of the bonnet. The discharged pieces are caught by the cladding collector 88 (see FIGS. 11 and 12) which is fixed to the inside walls of upper portion 76 of the bonnet. The discharged pieces will intercept the collector 88 as they fall under gravity. The pieces pass through an opening in the bonnet and into the leached hulls outlet 92 from where they are discharged outside the dissolver.

The sizes of the various dimensions of the apparatus will determine the throughput of the apparatus. In addition, a consideration in the design of the apparatus is that the geometry of the apparatus be favorable to prevent nuclear criticality. Safety is insured by limiting the concentrations of fissionable material or the dimensions of equipment. For a given fuel, a relationship exists between the pitch of the spiral, P, the diameter of the spiral tube, D, and the radius, R, of the spiral from its longitudinal axis (see FIG. 1). As the diameter of spiral tube increases and, thus, accommodating more fuel within each spiral loop, neutron interaction from adjacent loops increases. To reduce this intra-loop activity, the spiral pitch and radius can be altered. Numerical values for these quantities can be calculated by one skilled in the art of nuclear safety parameters. By using available tables and literature giving the minimum critical dimensions for various fissionable material in solution and in the metallic state along with the corresponding safe maximum values recommended for the design of process equipment and procedures, dimensional parameters may be calculated.

In addition, the drum 42 may be filled with a solution providing neutron moderation. Thus, the groups of solids in each of the spiral loops is separated from each other by intervening fluid. The solution reduces neutron interaction of fissionable materials in adjacent spiral loops thus minimizing the loop separation required for criticality prevention and minimizing overall dissolver dimensions. Additional neutron interaction reduction can be achieved by the addition of neutron poisons to the solution or to the surface of the spiral.

The solution, or bath, in the drum performs an additional function in that the bath provides a heat transfer medium. Because the bath surrounds each spiral loop, precise temperature control is possible. It has been determined that average dissolution rates are greatest in acid that is just below boiling temperature or in which fuel is added at room temperature and the solution is then brought up to the boiling point, see Watson, C.D., et. al., "Mechanical Processing of Spent Power Reactor Fuel at Oak Ridge National Laboratory," *Proceedings of the AEC Symposium for Chemical Processing of Irradiated Fuels from Power, Test and Research Reactors*, October 1959.

It has also been observed that extensive foaming results when fuel pellets are added directed to boiling acid. Therefore, it is desirable that the dissolver be capable of maintaining a sub-boiling temperature while removing reaction and radionuclide decay heat. The heat transfer liquid is circulated through the drum-spiral system after entering the system at the bath inlet 80 (see FIGS. 11 and 13). The liquid travels within the region 84 between the double walls that make up a portion of the lower half of the bonnet. Holes 90 on the inside wall 86 (FIG. 13) allow the liquid to penetrate the wall and surround the spiral. The liquid level within the drum remains constant because as the liquid is pumped into the drum the liquid rises above the top of the drum at 94 and is discharged through the bath outlet 82. After leaving the outlet 82, the liquid is circulated through a conventional heat exchanger (not shown) and then proceeds back to the bath inlet 80. At the heat exchanger, heat may be removed or added to the bath depending on whether the processed fuel emits sufficient heat to maintain the bath temperature below the boiling point of nitric acid.

The bath can serve yet an additional function by providing a liquid gas seal between the drum and bonnet much the same as the seals in the inlet annular receivers 12 and 36 and in the dissolver solution and off-gas outlet 52. The liquid both fills a volume of the drum 42 including the bottom portion. Thus, the mouth 57 of the bonnet 58 is completely submerged in the bath isolating the internal dissolver atmosphere from the exterior atmosphere.

The drum-spiral is rotatably supported on a frame 100 (see FIGS. 3, 11 and 14). The bonnet 58, dissolver solution and off-gas outlet 52, leached hulls outlet 92, and bath outlet 82 are rigidly supported on the frame 100. The rotational support for the drum-spiral assembly is provided by five wheels. Of course, the number of wheels may vary. Two lower wheels 106 are fixed to the frame 100 and ride a track 102 fixed to the outside and near the bottom of the drum (see FIGS. 3, 11 and 14). Similarly, two more wheels 108 support the drum about midway between the top and bottom of the drum and ride track 110. A fifth bottom wheel 112 supports the drum at the bottom and rides an annular track 118 fixed to the bottom of the drum. The drive means for rotating the drum-spiral assembly is a conventional motor 114 coupled to a drive wheel 116. The wheel 116 is caused to rotate which in turn causes the assembly to rotate.

What is claimed is:

1. An apparatus for providing countercurrent liquid-solid contact comprising:
   (a) an Archimedes' screw having a bottom end and a top end for conveying solids uphill from said bottom end to said top end;
   (b) a distribution system including a first housing containing a plurality of first weirs and a plurality of first means for maintaining open communications between said housing and said Archimedes' screw so that liquid may pass between said screw and said housing;
   (c) means for injecting solid material into said bottom end of said Archimedes' screw;
   (d) means for injecting liquid into said distribution system;
   (e) means for rotatably supporting said Archimedes' screw with its longitudinal axis at an acute angle with respect to the horizontal;
   (f) means for rotating said Archimedes' screw about said longitudinal axis to convey said solids uphill;
   (g) means for withdrawing liquid and dissolved solids after contact with said solids from said apparatus; and
   (h) means for withdrawing undissolved solid material after contact with said liquid from said Archimedes' screw.

2. The apparatus of claim 1 in which said first housing includes a central tube which encloses said first weirs.

3. The apparatus of claim 2 in which said central tube is disposed along the axis of said Archimedes' screw.

4. The apparatus of claim 3 in which said central tube is fixed to and rotates with said Archimedes' screw.

5. The apparatus of claim 4 in which said central tube is of substantially circular cross section.

6. The apparatus of claim 2 in which said first weirs are spaced along the length of said central tube and fixed to said central tube.

7. The apparatus of claim 6 wherein said plurality of first weirs includes at least six weirs and in which six of said first weirs are located in said central tube for every length equal to the pitch of said Archimedes' screw.

8. The apparatus of claim 6 in which each of said first weirs has the configuration of a portion of a disc-shaped member.

9. The apparatus of claim 6 in which each of said first weirs has the configuration of 270 degrees of a disc-shaped member.

10. The apparatus of claim 1 in which each of said first means for maintaining open communication is in flow communication with one of said first weirs.

11. The apparatus of claim 1 in which said means for injecting solids into said bottom end of said Archimedes' screw comprises an extension tube with one end in open communication with said bottom end and its other end located substantially at said top end of said Archimedes' screw.

12. The apparatus of claim 1 further comprising a means for withdrawing off-gases from said distribution system produced during the liquid-solid contacting.

13. The apparatus of claim 1 wherein said means for rotatably supporting said Archimedes' screw supports said Archimedes' screw with its longitudinal axis at an acute angle between 25° and 45°.

14. The apparatus of claim 13 wherein said means for rotatably supporting said Archimedes' screw supports said Archimedes' screw with its longitudinal axis at an acute angle between 30° and 45°.

15. The apparatus of claim 1 in which said Archimedes' screw is outside of said central tube which encloses said first weirs.

16. The apparatus of claim 1 further comprising:
(a) an open topped container in which said Archimedes' screw is disposed, said container having an opening in its bottom through which said central tube extends in sealing engagement with the periphery of said opening, said central tube being in open communication with said means for withdrawing liquid;
(b) a liquid solution forming a liquid bath in said container in which said Archimedes' screw is partially submerged; and
(c) means for exchanging heat with said bath.

17. The apparatus of claim 16 in which said means for withdrawing liquid is in movable sealing engagement with that portion of said central tube that extends through said opening in said container.

18. The apparatus of claim 17 in which said sealing engagement includes a liquid seal.

19. The apparatus of claim 16 further comprising a bonnet having at least one opening in sealing engagement with said container.

20. The apparatus of claim 19 in which said sealing engagement between said bonnet and said container comprises a liquid seal between said container and said bonnet.

21. The apparatus of claim 16 further comprising a means for adding and removing said liquid bath from said container while said Archimedes' screw is rotating.

22. The apparatus of claim 16 in which said liquid bath includes a neutron poison.

23. The apparatus of claim 1 further comprising:
(a) a rinse distribution system including a second housing containing at least one second weir and a second means for maintaining open communication between said second housing and said Archimedes' screw said second means being constructed and arranged so as to distribute rinse solution at a position on said Archimedes' screw such that said undissolved solid material is rinsed with said rinse solution before leaving said Archimedes' screw by said means for withdrawing said undissolved solid material; and
(b) means for injecting rinsing solution into said rinse distribution system.

24. The apparatus of claim 23 wherein said at least one second well includes a plurality of second weirs and wherein said first housing and second housing constructed and arranged with respect to said central tube so that said first weirs and said second weirs are enclosed by said central tube.

25. The apparatus of claim 24 in which said Archimedes' screw is a spiral having the configuration of a hollow tube bent spirally around an axis.

26. The apparatus of claim 25 in which said means for maintaining open communication between said second distribution system and said Archimedes' screw comprises a hollow rinse spoke fixed at one end to said Archimedes' screw and fixed at its other end to said central tube.

27. The apparatus of claim 26 in which said means for injecting rinsing solution into said rinse distribution system comprises:
(a) a rinse receiver in which rinsing solution is placed;
(b) a rinse inlet tube connecting said rinse receiver and said rinse spoke in open communication.

28. The apparatus of claim 1 in which said Archimedes' screw is a spiral comprising a hollow tube bent spirally around an axis.

29. The apparatus of claim 28 in which said means for maintaining open communication between said first distribution system of first weirs and said Archimedes' screw comprises a hollow spoke fixed at one end to said Archimedes' screw and fixed at its other end to said central tube.

30. The apparatus of claim 29 in which said means for injecting solution into said distribution system of first weirs comprises:
(a) a solution receiver in which said solution is placed;
(b) a solution inlet tube connecting said receiver and one of said spokes in open communication.

31. The apparatus of claim 30 in which said distribution system of first weirs includes a central tube which encloses said first weirs, said central tube disposed along the axis of said spiral and fixed to said spiral.

32. The apparatus of claim 31 in which said first weirs are spaced along the length of said central tube and fixed to said central tube.

33. The apparatus of claim 32 in which each of said first weirs has the configuration of a portion of a disc-shaped member.

34. The apparatus of claim 33 in which each of said first weirs has the configuration of 270 degrees of a disc-shaped member.

35. The apparatus of claim 33 in which each of said first weirs is a portion of a disc-shaped member having a cut-out portion bounded by a radii, an arc segment and a broken line segment.

36. The apparatus of claim 33 in which each of said first weirs is a disc-shaped member having a cut-out portion bounded by a straight segment, an arc segment and a broken line segment.

37. The apparatus of claim 33 in which said plurality of first weirs includes a sufficient number of weirs so that at least four first weirs are located in said central tube for every length equal to the pitch of said Archimedes' screw.

38. The apparatus of claim 37 in which each of said means for maintaining open communication is in flow communication with one of said first weirs.

39. The apparatus of claim 38 further comprising:
(a) a second distribution system including a second housing said second housing including at least one second weir;
(b) a second means for maintaining open communication between said distribution of second weirs and said Archimedes' screw said second means being constructed and arranged so as to distribute rinse solution at a position on said Archimedes' screw such that said undissolved solid is rinsed with said rinse solution before leaving said Archimedes' screw by said means for withdrawing said undissolved solid material; and
(c) means for injecting rinsing solution into said second housing.

40. The apparatus of claim 39 in which said means for maintaining open communication between said second distribution system and said Archimedes' screw comprises a hollow rinse spoke fixed at one end to said Archimedes' screw and fixed at its other end to said central tube.

41. The apparatus of claim 40 in which said means for injecting solids into said bottom of said Archimedes' screw comprises an extension tube with one end in open communication with said bottom and its other end located substantially at said top end of said Archimedes' screw.

42. The apparatus of claim 33 in which said plurality of first weirs includes a sufficient number of weirs so that six first weirs are located in said central tube for every length equal to the pitch of said Archimedes' screw.

43. An apparatus for continuously providing countercurrent liquid-solid contact comprising:
   (a) a means for separating solids into compartments and conveying the compartments uphill one after another;
   (b) a distribution system including a housing containing a plurality of weirs;
   (c) means for injecting solids into said separating and conveying means;
   (d) means for injecting solution into said distribution system for distribution to said compartments;
   (e) means for maintaining open communications between said distribution system and said compartments so that solution may be diverted by said distribution system containing said weirs back and forth between said distribution system and said separating and conveying means;
   (f) means for withdrawing solution after contact with said solids from said separating and conveying means, and
   (g) means for withdrawing solids after contact with said solution from said separating and conveying means.

44. The apparatus of claim 43 in which the system includes a central tube which encloses said weirs.

45. The apparatus of claim 44 in which said central tube is fixed to said separating and conveying means.

46. The apparatus of claim 45 in which said weirs are spaced along the length of said central tube and fixed to said central tube.

47. The apparatus of claim 46 in which the means for separating solids into compartments and conveying uphill is outside of said central tube in which said weirs are located.

48. The apparatus of claim 47 in which said weirs are spaced along the length of said central tube and fixed to said central tube.

49. The apparatus of claim 48 wherein said plurality of weirs includes at least six weirs and in which six weirs are located in said central tube for every compartment.

50. The apparatus of claim 49 in which each of said weirs has the configuration of a portion of a disc-shaped member.

51. The apparatus of claim 50 in which each of said weirs has the configuration of 270 degrees of a disc-shaped member.

52. The apparatus of claim 47 in which the means for separating solids into compartments and conveying the compartments uphill is an Archimedes' screw rotatably supported with its longitudinal axis at an acute angle with respect to the horizontal.

53. The apparatus of claim 52 in which said Archimedes' screw is in the form of a spiral.

54. The apparatus of claim 43 in which each of said means for maintaining open communication is in flow communication with one of said weirs.

55. The apparatus of claim 52 in which the means for maintaining open communication comprises substantially a single opening in flow communication with each weir.

56. An apparatus for continuously providing countercurrent liquid-solid contact comprising;
   (a) a means for separating solids into groups, each group separated from each other by intervening fluid and conveying the groups uphill one after another so that said groups are in ascending order from a bottom group to a top group;
   (b) a distribution system including a housing containing a plurality of weirs;
   (c) means for injecting solids into said separating and conveying means;
   (d) means for injecting dissolving solution into said distribution system for distribution to said groups;
   (e) means for maintaining open communication between said distribution system and said groups so that solution may be diverted by said distribution system containing said weirs back and forth between said distribution system and said groups;
   (f) means for injecting solids into said bottom group to be conveyed uphill;
   (g) means for withdrawing spent solution from said bottom group; and
   (h) means for withdrawing solids after contact with said solution from said top group.

57. The apparatus of claim 56 in which the means for separating solids into groups and sequentially conveying the groups uphill is an Archimedes' screw rotatably supported with its longitudinal axis at an acute angle with respect to the horizontal.

58. The apparatus of claim 57 in which said Archimedes' screw in the form of a spiral.

59. The apparatus of claim 58 in which the system includes a central tube which encloses said weirs.

60. The apparatus of claim 59 in which said central tube is fixed to said spiral.

61. The apparatus of claim 60 in which said weirs are spaced along the length of said central tube and fixed to said central tube.

62. The apparatus of claim 61 in which the spiral is outside of said central tube in which said weirs are located.

63. The apparatus of claim 62 in which the means for maintaining open communication comprises substantially a single opening in flow communication with each weir.

64. An apparatus for processing nuclear fuel comprising:
   (a) an Archimedes' screw in the form of a spiral having a longitudinal axis of rotation;
   (b) a distribution system including a central tube disposed along said axis of said spiral containing a plurality of weirs and plurality of hollow spokes fixed at one end to said spiral and fixed at its other end to said central tube;
   (c) means for injecting nuclear material into said bottom end of said spiral;
   (d) means for injecting dissolving solution into said distribution system;
   (e) means for rotatably supporting said spiral with its longitudinal axis at an acute angle with respect to the horizontal;
   (f) means for rotating said spiral about said longitudinal axis to convey said nuclear material uphill;
   (g) means for withdrawing solution from said apparatus; and
   (h) means for withdrawing nuclear material from said apparatus.

* * * * *